(12) United States Patent
Shibutani

(10) Patent No.: US 12,372,472 B2
(45) Date of Patent: Jul. 29, 2025

(54) MICRO-RAMAN DEVICE

(71) Applicant: SHIMADZU CORPORATION, Kyoto (JP)

(72) Inventor: Ryuta Shibutani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 148 days.

(21) Appl. No.: 18/382,930

(22) Filed: Oct. 23, 2023

(65) Prior Publication Data

US 2024/0142380 A1    May 2, 2024

(30) Foreign Application Priority Data

Oct. 26, 2022    (JP) .................. 2022-171599

(51) Int. Cl.
| | |
|---|---|
| *G01N 21/65* | (2006.01) |
| *G01J 3/02* | (2006.01) |
| *G01J 3/08* | (2006.01) |
| *G01J 3/10* | (2006.01) |
| *G01J 3/44* | (2006.01) |
| *G01N 21/01* | (2006.01) |

(52) U.S. Cl.
CPC ............ *G01N 21/65* (2013.01); *G01J 3/0205* (2013.01); *G01J 3/0213* (2013.01); *G01J 3/0232* (2013.01); *G01J 3/0235* (2013.01); *G01J 3/08* (2013.01); *G01J 3/10* (2013.01); *G01J 3/44* (2013.01); *G01J 3/4412* (2013.01); *G01N 21/01* (2013.01); *G01J 2003/104* (2013.01); *G01J 2003/106* (2013.01); *G01N 2021/656* (2013.01)

(58) Field of Classification Search
CPC .. G01N 21/65; G01N 21/01; G01N 2021/656; G01J 3/0205; G01J 3/0213; G01J 3/0232; G01J 3/0235; G01J 3/08; G01J 3/10; G01J 3/44; G01J 3/4412; G01J 2003/104; G01J 2003/106
USPC ......................................................... 356/301
See application file for complete search history.

(56) References Cited

U.S. PATENT DOCUMENTS

| | | | | |
|---|---|---|---|---|
| 4,158,505 A | * | 6/1979 | Mathisen | G01J 3/0232 356/325 |
| 6,621,574 B1 | * | 9/2003 | Forney | G01N 21/65 250/252.1 |

(Continued)

FOREIGN PATENT DOCUMENTS

| | | | | | |
|---|---|---|---|---|---|
| CN | 113984202 A | * | 1/2022 | ............ | G01J 3/0205 |
| CN | 114755838 A | * | 7/2022 | ............ | G02B 27/30 |
| JP | H10-90064 A | | 4/1998 | | |

*Primary Examiner* — Michelle M Iacoletti
*Assistant Examiner* — Noah J. Haney
(74) *Attorney, Agent, or Firm* — Renner, Otto, Boisselle & Sklar, LLP

(57) ABSTRACT

A micro-Raman device includes a first laser light source, a second laser light source, a first holder, a second holder, a first ND filter, and a second ND filter. The first laser light source and the second laser light source generate first laser light of a first wavelength and second laser light of a second wavelength, respectively. The second wavelength is different from the first wavelength. The first laser light and the second laser light proceed in a second direction orthogonal to a first direction while being separated from each other in the first direction. The first holder and the second holder are arranged overlapping each other in the second direction.

4 Claims, 9 Drawing Sheets

(56) References Cited

U.S. PATENT DOCUMENTS

| | | | | |
|---|---|---|---|---|
| 2006/0038980 | A1* | 2/2006 | Naka | G01N 21/65 |
| | | | | 356/73 |
| 2007/0274634 | A1* | 11/2007 | Yabe | G02B 21/16 |
| | | | | 385/37 |
| 2008/0117421 | A1* | 5/2008 | Yamaguchi | G01J 3/021 |
| | | | | 356/417 |
| 2012/0190034 | A1* | 7/2012 | Tajima | G01J 3/4406 |
| | | | | 435/6.12 |
| 2018/0275067 | A1* | 9/2018 | Roberts | G01J 3/021 |
| 2024/0019675 | A1* | 1/2024 | Dennis | G02B 21/36 |

\* cited by examiner

MICRO-RAMAN DEVICE

CROSS REFERENCE TO RELATED APPLICATIONS

This nonprovisional application is based on Japanese Patent Application No. 2022-171599 filed on Oct. 26, 2022 with the Japan Patent Office, the entire contents of which are hereby incorporated by reference.

BACKGROUND OF THE INVENTION

Field of the Invention

The present disclosure relates to a micro-Raman device.

Description of the Background Art

For example, Japanese Patent Laying-Open No. 10-90064 describes a micro-Raman device. The micro-Raman device described in Patent Literature 1 includes a pumping laser, a spectrometer, and a detector. With the micro-Raman device described in Patent Literature 1, laser light is radiated on a sample from the pumping laser, and Raman scattered light is generated by the sample. The Raman scattered light is scattered in the spectrometer, and intensity distribution of the Raman scattered light that is scattered is detected by the detector.

SUMMARY OF THE INVENTION

A micro-Raman device sometimes includes, as pumping lasers, a plurality of laser light sources (given as a first laser light source and a second laser light source). In the case where the micro-Raman device includes the first laser light source and the second laser light source, laser light from one of the first laser light source and the second laser light source has to be blocked using a shutter or one of the first laser light source and the second laser light source has to be placed in an off state so that the laser light is not radiated on a sample.

In the case of using a shutter to block laser light from one of the first laser light source and the second laser light source, a size of the micro-Raman device is increased. In the case of placing one of the first laser light source and the second laser light source in an off state, it takes time for output to be stabilized at a time when one of the first laser light source and the second laser light source that is in the off state is placed in an on state again.

Furthermore, with the micro-Raman device, intensity of laser light to be radiated on a sample has to be finely adjusted. A large number of ND filters are thus required, and the size of the micro-Raman device is increased.

A micro-Raman device of the present disclosure has been made in view of the above. More specifically, there is provided a micro-Raman device with which laser light from one of a first laser light source and a second laser light source can be blocked without placing the one of the first laser light source and the second laser light source in an off state, and also, intensity of laser light can be finely adjusted while reducing a size of the device.

The micro-Raman device according to the present disclosure includes a first laser light source, a second laser light source, a first holder, a second holder, a first ND filter, and a second ND filter. The first laser light source and the second laser light source generate first laser light of a first wavelength and second laser light of a second wavelength, respectively. The second wavelength is different from the first wavelength. The first laser light and the second laser light proceed in a second direction orthogonal to a first direction while being separated from each other in the first direction. The first holder and the second holder are arranged overlapping each other in the second direction. The first holder is rotatable around a first rotation axis that is parallel to the second direction. The second holder is rotatable around a second rotation axis that is parallel to the second direction. A first through hole, a second through hole, a third through hole, and a fourth through hole that penetrate through the first holder in the second direction are formed in the first holder. When seen along the second direction, the first through hole and the second through hole are on an arc that has the first rotation axis at a center and that has a radius that is equal to a distance between the first rotation axis and the first laser light. When seen along the second direction, the third through hole and the fourth through hole are on an arc that has the first rotation axis at a center and that has a radius that is equal to a distance between the first rotation axis and the second laser light. A distance between the second through hole and the fourth through hole is smaller than a distance between the second through hole and the third through hole. When the first holder is rotated around the first rotation axis such that one of the first through hole and the second through hole overlaps with the first laser light, the third through hole and the fourth through hole are both shifted from the second laser light. When the first holder is rotated around the first rotation axis such that one of the third through hole and the fourth through hole overlaps with the second laser light, the first through hole and the second through hole are both shifted from the first laser light. A fifth through hole, a sixth through hole, a seventh through hole, and an eighth through hole that penetrate through the second holder in the second direction are formed in the second holder. When seen along the second direction, the fifth through hole and the sixth through hole are on an arc that has the second rotation axis at a center and that has a radius that is equal to a distance between the second rotation axis and the first laser light. When seen along the second direction, the seventh through hole and the eighth through hole are on an arc that has the second rotation axis at a center and that has a radius that is equal to a distance between the second rotation axis and the second laser light. A distance between the sixth through hole and the eighth through hole is smaller than a distance between the sixth through hole and the seventh through hole. When the second holder is rotated around the second rotation axis such that one of the fifth through hole and the sixth through hole overlaps with the first laser light, the seventh through hole and the eighth through hole are both shifted from the second laser light. When the second holder is rotated around the second rotation axis such that one of the seventh through hole and the eighth through hole overlaps with the second laser light, the fifth through hole and the sixth through hole are both shifted from the first laser light. The first ND filter is arranged on the first holder in a manner extending over the second through hole and the fourth through hole. The second ND filter is arranged on the second holder in a manner extending over the sixth through hole and the eighth through hole.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Details of embodiments of the present disclosure will be described with reference to the drawings. In the following drawings, same or corresponding parts are denoted by a same reference sign, and a redundant description is omitted.

First Embodiment

A micro-Raman device according to a first embodiment will be described. The micro-Raman device according to the first embodiment will be given as a micro-Raman device 100.

<Configuration of Micro-Raman Device 100>

A configuration of micro-Raman device 100 will be described below.

Figure 1:
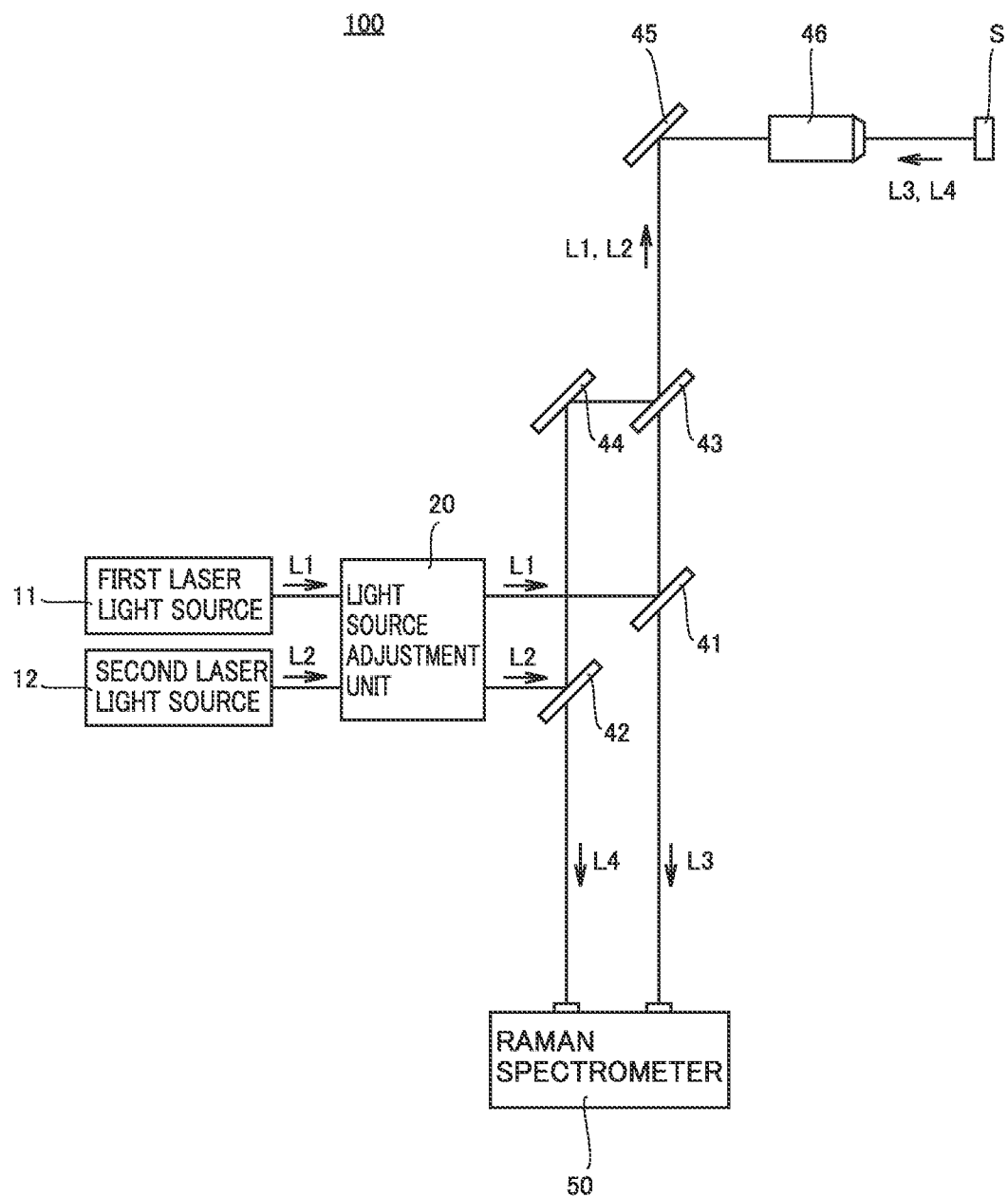
FIG. 1 is a schematic view of a micro-Raman device 100.

FIG. 1 is a schematic view of micro-Raman device 100. As shown in FIG. 1, micro-Raman device 100 includes a first laser light source 11, a second laser light source 12, a light source adjustment unit 20, a long-pass filter 41, a long-pass filter 42, a dichroic mirror 43, a dichroic mirror 44, a mirror 45, an objective lens 46, and a Raman spectrometer 50.

First laser light source 11 generates first laser light L1. Second laser light source 12 generates second laser light L2. Light source adjustment unit 20 allows one of first laser light L1 and second laser light L2 to pass. When passing through light source adjustment unit 20, one of first laser light L1 and second laser light L2 may have intensity thereof adjusted. Details of light source adjustment unit 20 will be given later.

First laser light L1 that passed through light source adjustment unit 20 is reflected by long-pass filter 41 and passes through dichroic mirror 43. First laser light L1 that passed through dichroic mirror 43 is reflected by mirror 45 and passes through objective lens 46. First laser light L1 is thus radiated on a sample S. When irradiated with the first laser light, sample S generates first Raman light L3.

First Raman light L3 generated at sample S passes through objective lens 46 and is reflected by mirror 45. First Raman light L3 reflected by mirror 45 sequentially passes through dichroic mirror 43 and long-pass filter 41. First Raman light L3 that passed through long-pass filter 41 enters Raman spectrometer 50. Raman measurement using first laser light L1 is thus performed.

Second laser light L2 that passed through light source adjustment unit 20 is reflected by long-pass filter 42 and passes through dichroic mirror 44. Second laser light L2 that passed through dichroic mirror 44 is reflected by mirror 45 and passes through objective lens 46. Second laser light L2 is thus radiated on sample S. When irradiated with the second laser light, sample S generates second Raman light L4.

Second Raman light L4 generated at sample S passes through objective lens 46 and is reflected by mirror 45. Second Raman light L4 reflected by mirror 45 sequentially passes through dichroic mirror 44 and long-pass filter 42. Second Raman light L4 that passed through long-pass filter 42 enters Raman spectrometer 50. Raman measurement using second laser light L2 is thus performed.

Figure 2:
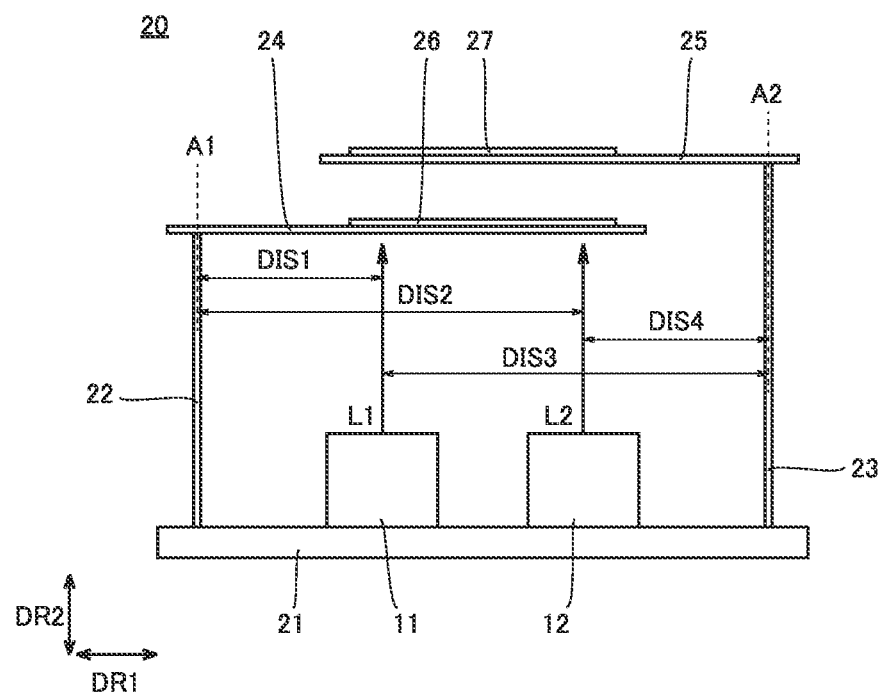
FIG. 2 is a schematic side view of a light source adjustment unit 20 of micro-Raman device 100.

FIG. 2 is a schematic side view of light source adjustment unit 20 of micro-Raman device 100. As shown in FIG. 2, light source adjustment unit 20 includes a base 21, a first shaft member 22, a second shaft member 23, a first holder 24, a second holder 25, an ND filter 26, and an ND filter 27.

First laser light source 11 and second laser light source 12 are disposed on base 21 with a space in between in a first direction DR1. First laser light L1 generated by first laser light source 11 and second laser light L2 generated by second laser light source 12 proceed along a second direction DR2 orthogonal to first direction DR1. That is, first laser light L1 and second laser light L2 proceed along second direction DR2 while being separated from each other in first direction DR1.

First shaft member 22 is attached to base 21. First shaft member 22 extends along second direction DR2. Second shaft member 23 is attached to base 21. Second shaft member 23 extends along second direction DR2.

First holder 24 is attached to first shaft member 22 in a manner capable of rotating around a first rotation axis A1. First rotation axis A1 is parallel to second direction DR2. Second holder 25 is attached to second shaft member 23 in a manner capable of rotating around a second rotation axis A2. Second rotation axis A2 is parallel to second direction DR2. A distance between first rotation axis A1 and first laser light L1 is given as a distance DIS1. A distance between first rotation axis A1 and second laser light L2 is given as a distance DIS2. A distance between second rotation axis A2 and first laser light L1 is given as a distance DIS3. A distance between second rotation axis A2 and second laser light L2 is given as a distance DIS4. Distance DIS2 is greater than distance DIS1. Distance DIS3 is greater than distance DIS4.

First holder 24 and second holder 25 are formed of a material that does not allow first laser light L1 and second laser light L2 to pass. For example, first holder 24 and second holder 25 are formed of a metal material.

Figure 3:
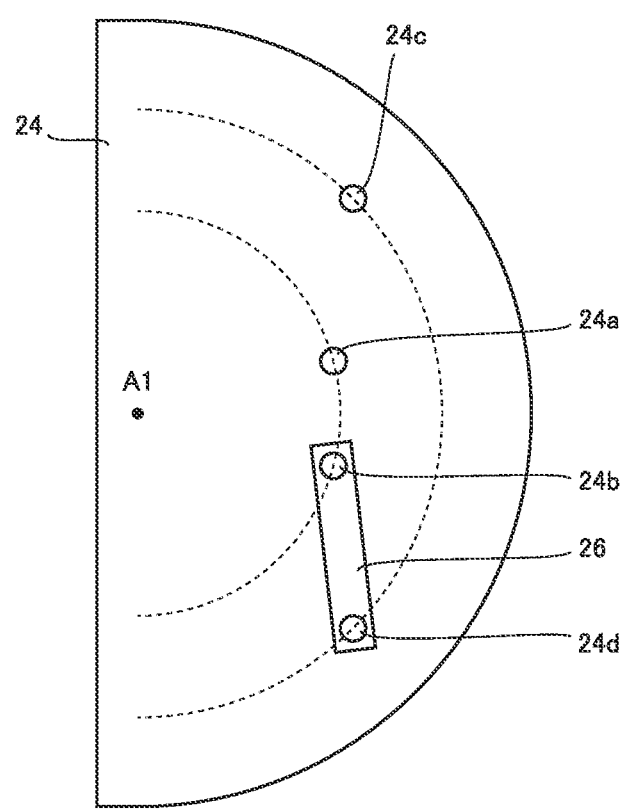
FIG. 3 is a plan view of a first holder 24 of micro-Raman device 100 seen along a second direction DR2.

FIG. 3 is a plan view of first holder 24 of micro-Raman device 100 seen along second direction DR2. As shown in FIG. 3, a planar shape of first holder 24 is a semicircle, for example. However, the planar shape of first holder 24 is not limited to such a shape. A through hole 24a, a through hole 24b, a through hole 24c, and a through hole 24d are formed in first holder 24. Through hole 24a, through hole 24b, through hole 24c, and through hole 24d penetrate through first holder 24 in second direction DR2.

When seen along second direction DR2, through hole 24a and through hole 24b are arranged on a first arc. The first arc is an arc that has first rotation axis A1 at a center, and that has a radius that is equal to distance DIS1. When seen along second direction DR2, through hole 24c and through hole 24d are arranged on a second arc. The second arc is an arc that has first rotation axis A1 at a center, and that has a radius that is equal to distance DIS2. A distance between through hole 24b and through hole 24d is equal to or less than a distance between through hole 24b and through hole 24c.

When first holder 24 is rotated around first rotation axis A1 such that first laser light L1 overlaps with through hole 24a or through hole 24b, through hole 24c and through hole 24d are shifted from second laser light L2. When first holder 24 is rotated around first rotation axis A1 such that second laser light L2 overlaps with through hole 24c or through hole 24d, through hole 24a and through hole 24b are shifted from first laser light L1. That is, when seen along second direction DR2, through hole 24a and through hole 24b are not on a virtual straight line connecting through hole 24c and first rotation axis A1, and are not on a virtual straight line connecting through hole 24d and first rotation axis A1.

In other words, when first holder 24 is rotated around first rotation axis A1 such that first laser light L1 overlaps with one of through hole 24a and through hole 24b, second laser light L2 is blocked by first holder 24, and when first holder 24 is rotated around first rotation axis A1 such that second laser light L2 overlaps with one of through hole 24c and through hole 24d, first laser light L1 is blocked by first holder 24.

Figure 4:
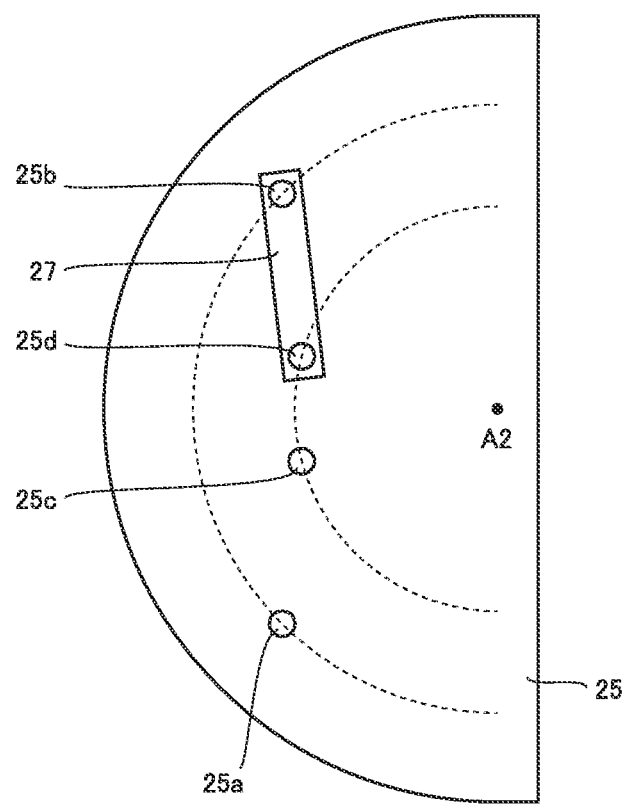
FIG. 4 is a plan view of a second holder 25 of micro-Raman device 100 seen along second direction DR2.

FIG. 4 is a plan view of second holder 25 of micro-Raman device 100 seen along second direction DR2. As shown in FIG. 4, a planar shape of second holder 25 is a semicircle, for example. However, the planar shape of second holder 25 is not limited to such a shape. A through hole 25a, a through hole 25b, a through hole 25c, and a through hole 25d are formed in second holder 25. Through hole 25a, through hole 25b, through hole 25c, and through hole 25d penetrate through second holder 25 in second direction DR2.

When seen along second direction DR2, through hole 25a and through hole 25b are arranged on a third arc. The third arc is an arc that has second rotation axis A2 at a center, and that has a radius that is equal to distance DIS3. When seen along second direction DR2, through hole 25c and through hole 25d are arranged on a fourth arc. The fourth arc is an arc that has second rotation axis A2 at a center, and that has a radius that is equal to distance DIS4. A distance between through hole 25b and through hole 25d is equal to or less than a distance between through hole 25b and through hole 25c.

When second holder 25 is rotated around second rotation axis A2 such that first laser light L1 overlaps with through hole 25a or through hole 25b, through hole 25c and through hole 25d are shifted from second laser light L2. When second holder 25 is rotated around second rotation axis A2 such that second laser light L2 overlaps with through hole 25c or through hole 25d, through hole 25a and through hole 25b are shifted from first laser light L1. That is, when seen along second direction DR2, through hole 25c and through hole 25d are not on a virtual straight line connecting through hole 25a and second rotation axis A2, and are not on a virtual straight line connecting through hole 25b and second rotation axis A2.

In other words, when second holder 25 is rotated around second rotation axis A2 such that first laser light L1 overlaps with one of through hole 25a and through hole 25b, second laser light L2 is blocked by second holder 25, and when second holder 25 is rotated around second rotation axis A2 such that second laser light L2 overlaps with one of through hole 25c and through hole 25d, first laser light L1 is blocked by second holder 25.

As shown in FIG. 3, ND filter 26 is arranged on first holder 24 in a manner extending over through hole 24b and through hole 24d. As shown in FIG. 4, ND filter 27 is arranged on second holder 25 in a manner extending over through hole 25b and through hole 25d. An OD value of ND filter 26 is preferably different from an OD value of ND filter 27. Additionally, an ND (neutral density) filter is an optical filter that reduces intensity of light passing through. An OD (optical density) value is a value indicating a transmittance of light through the ND filter. When the OD value is X, the value obtained by dividing intensity of light after passage through the ND filter by intensity of light before passage through the ND filter is $1\times10^{-X}$.

<Advantageous Effects of Micro-Raman Device 100>

With micro-Raman device 100, when first holder 24 is rotated around first rotation axis A1 such that through hole 24a or through hole 24b overlaps with first laser light L1, and second holder 25 is rotated around second rotation axis A2 such that through hole 25a or through hole 25b overlaps with first laser light L1, through hole 24c and through hole 24d are shifted from second laser light L2, and second laser light L2 is blocked by first holder 24.

In the same manner, with micro-Raman device 100, when first holder 24 is rotated around first rotation axis A1 such that through hole 24c or through hole 24d overlaps with second laser light L2, and second holder 25 is rotated around second rotation axis A2 such that through hole 25c or through hole 25d overlaps with second laser light L2, through hole 24a and through hole 24b are shifted from first laser light L1, and first laser light L1 is blocked by first holder 24. Accordingly, with micro-Raman device 100, first laser light L1 and second laser light L2 are selectively caused to pass through light source adjustment unit 20, and thus, it is not necessary to place one of first laser light source 11 and second laser light source 12 in an off state or to provide a shutter.

With respect to first laser light L1, there are a first pattern of sequentially passing through hole 24a and through hole 25a, a second pattern of passing through hole 24b and through hole 25a, a third pattern of passing through through hole 24a and through hole 25b, and a fourth pattern of passing through hole 24b and through hole 25b. In the first pattern, the first laser light L1 passes through light source adjustment unit 20 without being subjected to intensity adjustment, and in the second pattern, first laser light L1 passes through light source adjustment unit 20 by being subjected to intensity adjustment by only ND filter 26. In the third pattern, first laser light L1 passes through light source adjustment unit 20 by being subjected to intensity adjustment by only ND filter 27, and in the fourth pattern, first laser light L1 passes through light source adjustment unit 20 by being subjected to intensity adjustment by ND filter 26 and ND filter 27. That is, with micro-Raman device 100, four patterns of intensity adjustment may be applied to first laser light L1 by light source adjustment unit 20.

In the same manner, with micro-Raman device 100, four patterns of intensity adjustment may be applied to second laser light L2 by light source adjustment unit 20. Accordingly, with micro-Raman device 100, the size of micro-Raman device 100 may be reduced while allowing intensity adjustment to be finely performed on first laser light L1 and second laser light L2 in a greater number of patterns than the number of the ND filters (that is, two).

<Modification>

Figure 5:
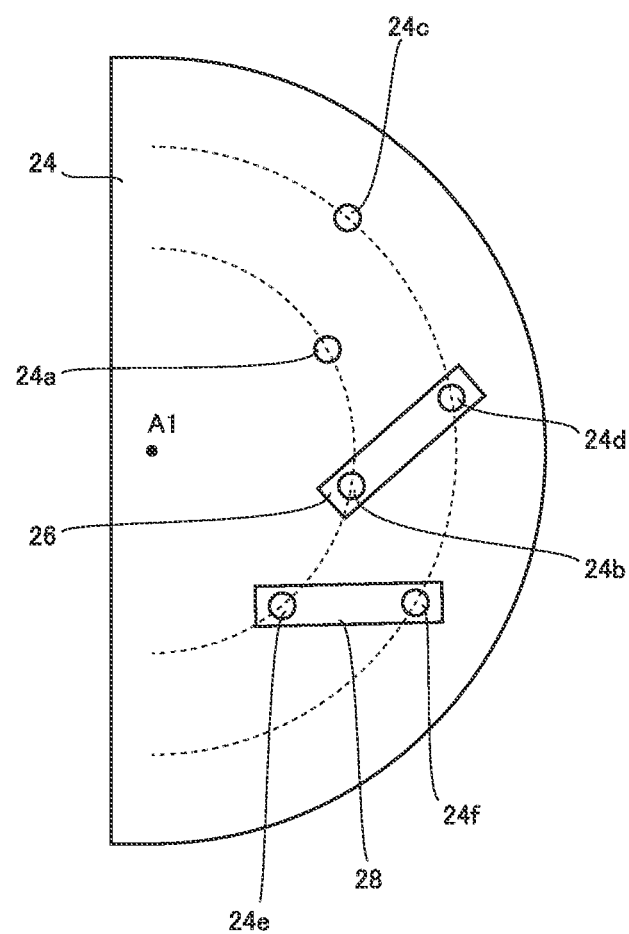
FIG. 5 is a plan view of first holder 24 of micro-Raman device 100 according to a modification seen along the second direction.

FIG. 5 is a plan view of first holder 24 of micro-Raman device 100 according to a modification seen along the second direction. As shown in FIG. 5, a through hole 24e and a through hole 24f may be further formed in first holder 24. Through hole 24e is on the first arc, and through hole 24f is on the second arc. When first holder 24 is rotated around first rotation axis A1 such that through hole 24e overlaps with first laser light L1, none of through hole 24b, through hole 24d, and through hole 24f overlaps with second laser light L2. When first holder 24 is rotated around first rotation axis A1 such that through hole 24f overlaps with second laser light L2, none of through hole 24a, through hole 24c, and through hole 24e overlaps with first laser light L1.

Additionally, in this example, the distance between through hole 24b and through hole 24d is equal to or less than the distance between the through hole 24b and through hole 24c and a distance between through hole 24b and through hole 24f, and a distance between through hole 24e and through hole 24f is equal to or less than a distance between through hole 24e and through hole 24c and a distance between through hole 24e and through hole 24d.

Figure 6:
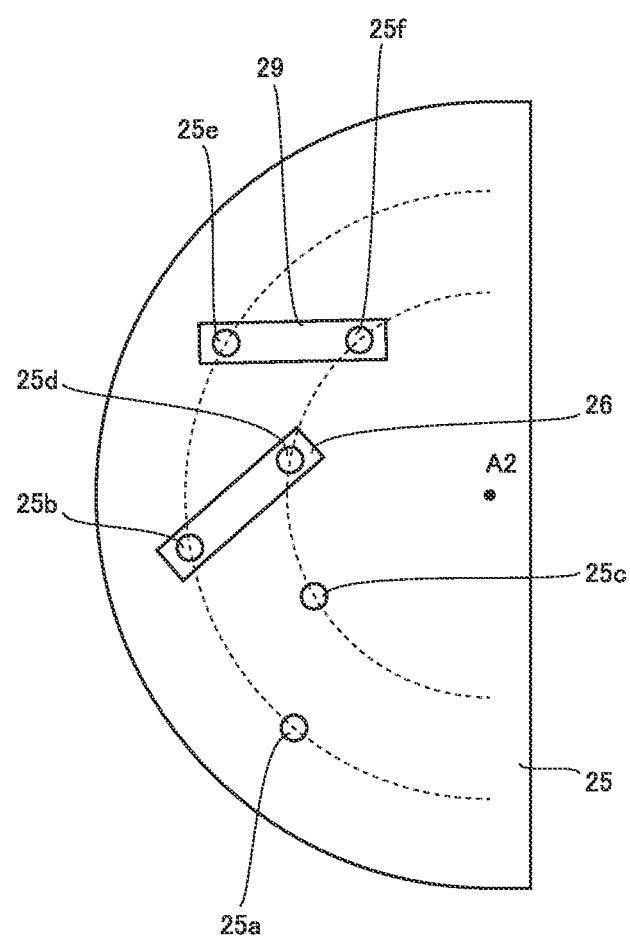
FIG. 6 is a plan view of second holder 25 of micro-Raman device 100 according to the modification seen along the second direction.

FIG. 6 is a plan view of second holder 25 of micro-Raman device 100 according to the modification seen along the second direction. As shown in FIG. 6, a through hole 25e and a through hole 25f may be further formed in second holder 25. Through hole 25e is on the third arc, and through hole 25f is on the fourth arc. When second holder 25 is rotated around second rotation axis A2 such that through hole 25e overlaps with first laser light L1, none of through hole 25b, through hole 25d, and through hole 25f overlaps with second laser light L2. When second holder 25 is rotated around second rotation axis A2 such that through hole 25f overlaps with second laser light L2, none of through hole 25a, through hole 25c, and through hole 25e overlaps with first laser light L1.

Additionally, in this example, the distance between through hole 25b and through hole 25d is equal to or less than the distance between through hole 25b and through hole 25c and a distance between through hole 25b and through hole 25f, and a distance between through hole 25e and through hole 25f is equal to or less than a distance between through hole 25e and through hole 25c and a distance between through hole 25e and through hole 25d.

Light source adjustment unit 20 may further include an ND filter 28 and an ND filter 29. ND filter 28 is arranged on first holder 24 in a manner extending over through hole 24e and through hole 24f. ND filter 29 is arranged on second holder 25 in a manner extending over through hole 25e and through hole 25f. An OD value of ND filter 28 is preferably different from the OD value of ND filter 26. An OD value of ND filter 29 is preferably different from the OD value of ND filter 27 and from the OD value of ND filter 28.

The OD value of ND filter 26 is preferably different from a sum of the OD value of ND filter 28 or the OD value of ND filter 29 and the OD value of ND filter 27. The OD value of ND filter 27 is preferably different from a sum of the OD value of ND filter 28 or the OD value of ND filter 29 and the OD value of ND filter 26. The OD value of ND filter 28 is preferably different from a sum of the OD value of ND filter 26 or the OD value of ND filter 27 and the OD value of ND filter 29. The OD value of ND filter 29 is preferably different from a sum of the OD value of ND filter 26 or the OD value of ND filter 27 and the OD value of ND filter 28.

In this example, intensity of first laser light L1 may be adjusted in nine patterns (a pattern where no intensity adjustment is applied, a pattern where intensity adjustment is applied only by ND filter 26, a pattern where intensity adjustment is applied only by ND filter 27, a pattern where intensity adjustment is applied only by ND filter 28, a pattern where intensity adjustment is applied only by ND filter 29, a pattern where intensity adjustment is applied by ND filter 26 and ND filter 27, a pattern where intensity adjustment is applied by ND filter 26 and ND filter 29, a pattern where intensity adjustment is applied by ND filter 28 and ND filter 27, and a pattern where intensity adjustment is applied by ND filter 28 and ND filter 29), and intensity of second laser light L2 may also be adjusted in nine patterns.

As described above, with micro-Raman device 100, the number of through holes on the first arc (given as first through holes), the number of through holes on the second arc (given as second through holes), the number of through holes on the third arc (given as third through holes), and the number of through holes on the fourth arc (given as fourth through holes) are not particularly specified. When the number of first through holes, the number of second through holes, the number of third through holes, and the number of fourth through holes are given as k (where k is a natural number of two or more), the number of ND filters arranged on first holder 24 (given as first ND filters), and the number of ND filters arranged on second holder 25 (given as second ND filters) are given as (k−1).

When first holder 24 is rotated around first rotation axis A1 such that one of a plurality of first through holes overlaps with first laser light L1, a plurality of second through holes are all shifted from second laser light L2, and when the first holder 24 is rotated around first rotation axis A1 such that one of the plurality of second through holes overlaps with second laser light L2, the plurality of first through holes are all shifted from first laser light L1. When second holder 25 is rotated around second rotation axis A2 such that one of a plurality of third through holes overlaps with first laser light L1, a plurality of fourth through holes are all shifted from second laser light L2, and when second holder 25 is rotated around second rotation axis A2 such that one of the plurality of fourth through holes overlaps with second laser light L2, the plurality of third through holes are all shifted from first laser light L1.

Each of a plurality of first ND filters is arranged on first holder 24 in a manner extending over one first through hole and a second through hole that is at a position closest to the one first through hole in question, and each of a plurality of second ND filters is arranged on second holder 25 in a manner extending over one third through hole and a fourth through hole that is at a position closest to the one third through hole in question.

Second Embodiment

A micro-Raman device according to a second embodiment will be described. The micro-Raman device according to the second embodiment will be given as a micro-Raman device 200. Here, differences from micro-Raman device 100 will be mainly described, and a redundant description will not be given.

<Configuration of Micro-Raman Device 200>

A configuration of micro-Raman device 200 will be described below.

Figure 7:
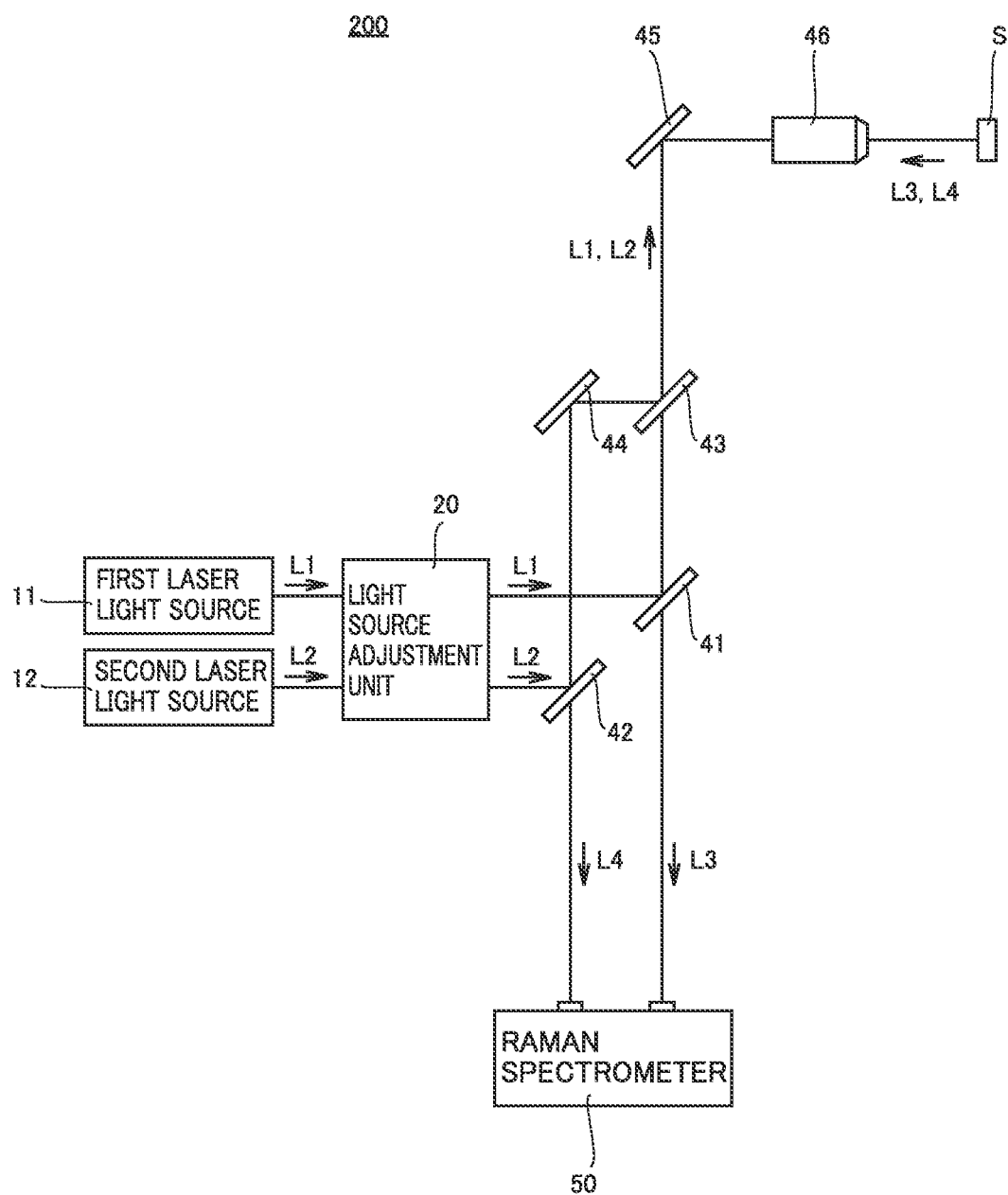
FIG. 7 is a schematic view of a micro-Raman device 200.

FIG. 7 is a schematic view of micro-Raman device 200. As shown in FIG. 7, micro-Raman device 200 includes first laser light source 11, second laser light source 12, light source adjustment unit 20, long-pass filter 41, long-pass filter 42, dichroic mirror 43, dichroic mirror 44, mirror 45, objective lens 46, and Raman spectrometer 50. In this regard, the configuration of micro-Raman device 200 is the same as the configuration of micro-Raman device 100.

Figure 8:
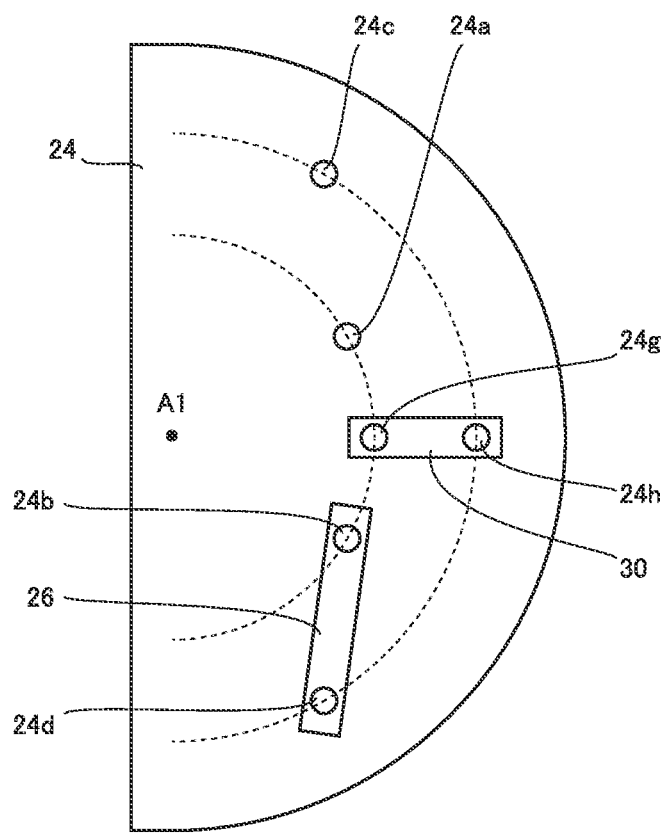
FIG. 8 is a plan view of first holder 24 of micro-Raman device 200 seen along second direction DR2.

FIG. 8 is a plan view of first holder 24 of micro-Raman device 200 seen along second direction DR2. As shown in FIG. 8, with micro-Raman device 200, a through hole 24g and a through hole 24h are further formed in first holder 24. Through hole 24g is on the first arc, and through hole 24h is on the second arc. Through hole 24g and through hole 24h penetrate through first holder 24 in second direction DR2.

When first holder 24 is rotated around first rotation axis A1 such that through hole 24g overlaps with first laser light L1, through hole 24h overlaps with second laser light L2. That is, when seen along second direction DR2, through hole 24g, through hole 24h, and first rotation axis A1 are on a same virtual straight line.

Figure 9:
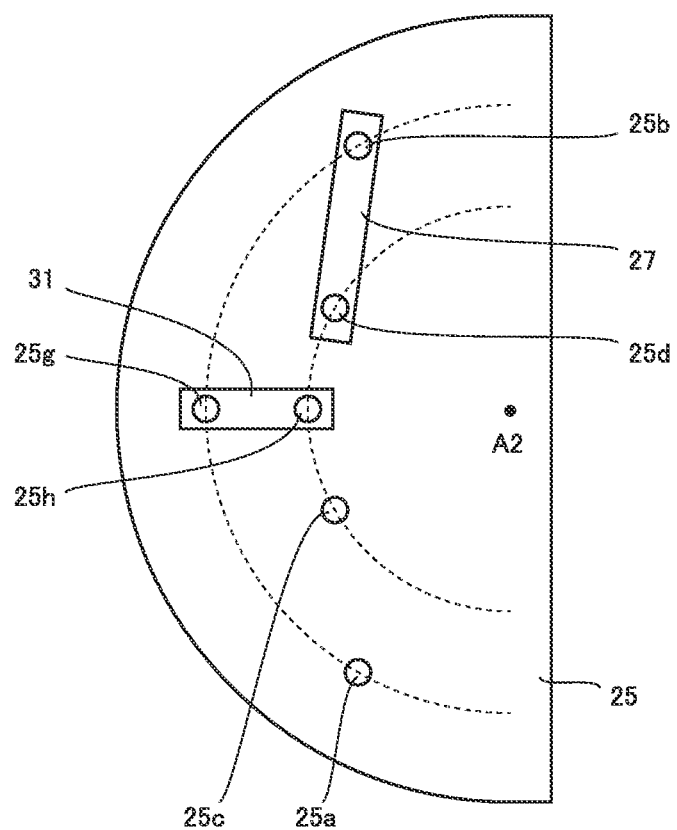
FIG. 9 is a plan view of second holder 25 of micro-Raman device 200 seen along second direction DR2.

FIG. 9 is a plan view of second holder 25 of micro-Raman device 200 seen along second direction DR2. As shown in FIG. 9, with micro-Raman device 200, a through hole 25g and a through hole 25h are further formed in second holder 25. Through hole 25g is on the third arc, and through hole 25h is on the fourth arc. Through hole 25g and through hole 25h penetrate through second holder 25 in second direction DR2. When second holder 25 is rotated around second rotation axis A2 such that through hole 25g overlaps with first laser light L1, through hole 25h overlaps with second laser light L2. That is, when seen along second direction DR2, through hole 25g, through hole 25h, and second rotation axis A2 are on a same virtual straight line.

With micro-Raman device 200, light source adjustment unit 20 further includes an ND filter 30 and an ND filter 31. ND filter 30 is arranged on first holder 24 in a manner extending over through hole 24g and through hole 24h. ND filter 31 is arranged on second holder 25 in a manner extending over through hole 25g and through hole 25h. An OD value of ND filter 30 is preferably different from the OD value of ND filter 26. An OD value of ND filter 31 is preferably different from the OD value of ND filter 27 and from the OD value of ND filter 30.

The OD value of ND filter 26 is preferably different from a sum of the OD value of ND filter 30 or the OD value of ND filter 31 and the OD value of ND filter 27. The OD value of ND filter 27 is preferably different from a sum of the OD value of ND filter 30 or the OD value of ND filter 31 and the OD value of ND filter 26. The OD value of ND filter 30 is preferably different from a sum of the OD value of ND filter 26 or the OD value of ND filter 27 and the OD value of ND filter 31. The OD value of ND filter 31 is preferably different from a sum of the OD value of ND filter 26 or the OD value of ND filter 27 and the OD value of ND filter 30. In this regard, the configuration of micro-Raman device 200 is different from the configuration of micro-Raman device 100.

<Advantageous Effects of Micro-Raman Device 200>

In the following, advantageous effects of micro-Raman device 200 will be described.

With micro-Raman device 200, intensity of first laser light L1 may be adjusted in eight patterns (a pattern where no intensity adjustment is applied, a pattern where intensity adjustment is applied only by ND filter 26, a pattern where intensity adjustment is applied only by ND filter 27, a pattern where intensity adjustment is applied only by ND filter 30, a pattern where intensity adjustment is applied only by ND filter 31, a pattern where intensity adjustment is applied by ND filter 26 and ND filter 27, a pattern where intensity adjustment is applied by ND filter 26 and ND filter 30, and a pattern where intensity adjustment is applied by ND filter 30 and ND filter 27), and intensity of second laser light L2 may also be adjusted in eight patterns.

<Modification>

Also with micro-Raman device 200, the number of through holes on the first arc (given as first through holes), the number of through holes on the second arc (given as second through holes), the number of through holes on the third arc (given as third through holes), and the number of through holes on the fourth arc (given as fourth through holes) are not particularly specified. When the number of first through holes, the number of second through holes, the number of third through holes, and the number of fourth through holes are given as k (where k is a natural number of two or more), the number of ND filters arranged on first holder 24 (given as first ND filters), and the number of ND filters arranged on second holder 25 (given as second ND filters) are given as (k−1).

One of a plurality of first through holes will be taken as a fifth through hole. One of a plurality of second through holes will be taken as a sixth through hole. One of a plurality of third through holes will be taken as a seventh through hole. One of a plurality of fourth through holes will be taken as an eighth through hole. When the first holder 24 is rotated around first rotation axis A1 such that the fifth through hole overlaps with first laser light L1, the sixth through hole overlaps with second laser light L2, and when second holder 25 is rotated around second rotation axis A2 such that the seventh through hole overlaps with first laser light L1, the eighth through hole overlaps with second laser light L2.

When first holder 24 is rotated around first rotation axis A1 such that one of the plurality of first through holes other than the fifth through hole overlaps with first laser light L1, the plurality of second through holes are all shifted from second laser light L2, and when first holder 24 is rotated around first rotation axis A1 such that one of the plurality of second through holes other than the sixth through hole overlaps with second laser light L2, the plurality of first through holes are all shifted from first laser light L2. When second holder 25 is rotated around second rotation axis A2 such that one of the plurality of third through holes other than the seventh through hole overlaps with first laser light L1, the plurality of fourth through holes are all shifted from second laser light L2, and when second holder 25 is rotated around second rotation axis A2 such that one of the plurality of fourth through holes other than the eighth through hole overlaps with second laser light L2, the plurality of third through holes are all shifted from first laser light L1.

One of a plurality of first ND filters will be taken as a third ND filter. The third ND filter is arranged on first holder 24 in a manner extending over the fifth through hole and the sixth through hole. One of a plurality of second ND filters will be taken as a fourth ND filter. The fourth ND filter is arranged on second holder 25 in a manner extending over the seventh through hole and the eighth through hole. Each of the plurality of first ND filters other than the third ND filter is arranged on first holder 24 in a manner extending over one first through hole other than the fifth through hole and a second through hole that is other than the sixth through hole and that is at a position closest to the one first through hole in question. Each of the plurality of second ND filters other than the fourth ND filter is arranged on second holder 25 in a manner extending over one third through hole other than the seventh through hole and a fourth through hole that is other than the eighth through hole and that is at a position closest to the one third through hole in question.

(Supplementary Notes)

The embodiments described above include the following configurations.

<Supplementary Note 1>

A micro-Raman device including;
a first laser light source;
a second laser light source;
a first holder;
a second holder;
a first ND filter; and
a second ND filter, in which the first laser light source and the second laser light source generate first laser light of a first wavelength and second laser light of a second wavelength, respectively, the second wavelength is different from the first wavelength, the first laser light and the second laser light proceed in a second direction orthogonal to a first direction while being separated from each other in the first direction, the first holder and the second holder are arranged overlapping each other in the second direction, the first holder is rotatable around a first rotation axis that is parallel to the second direction, the second holder is rotatable around a second rotation axis that is parallel to the second direction, a first through hole, a second through hole, a third through hole, and a fourth through hole that penetrate through the first holder in the second direction are formed in the first holder, when seen along the second direction, the first through hole and the second through hole are on an arc that has the first rotation axis at a center and that has a radius that is equal to a distance between the first rotation axis and the first laser light, when seen along the second direction, the third through hole and the fourth through hole are on an arc that has the first rotation axis at a center and that has a radius that is equal to a distance between the first rotation axis and the second laser light, a distance between the second through hole and the fourth through hole is smaller than a distance between the second through hole and the third through hole, when the first holder is rotated around the first rotation axis such that one of the first through hole and the second through hole overlaps with the first laser light, the third through hole and the fourth through hole are both shifted from the second laser light, when the first holder is rotated around the first rotation axis such that one of the third through hole and the fourth through hole overlaps with the second laser light, the first through hole and the second through hole are both shifted from the first laser light, a fifth through hole, a sixth through hole, a seventh through hole, and an eighth through hole that penetrate through the second holder in the second direction are formed in the second holder, when seen along the second direction, the fifth through hole and the sixth through hole are on an arc that has the second rotation axis at a center and that has a radius that is equal to a distance between the second rotation axis and the first laser light, when seen along the second direction, the seventh through hole and the eighth through hole are on an arc that has the second rotation axis at a center and that has a radius that is equal to a distance between the second rotation axis and the second laser light, a distance between the sixth through hole and the eighth through hole is smaller than a distance between the sixth through hole and the seventh through hole, when the second holder is rotated around the second rotation axis such that one of the fifth through hole and the sixth through hole overlaps with the first laser light, the seventh through hole and the eighth through hole are both shifted from the second laser light, when the second holder is rotated around the second rotation axis such that one of the seventh through hole and the eighth through hole overlaps with the second laser light, the fifth through hole and the sixth through hole are both shifted from the first laser light, the first ND filter is arranged on the first holder in a manner extending over the second through hole and the fourth through hole, and the second ND filter is arranged on the second holder in a manner extending over the sixth through hole and the eighth through hole.

<Supplementary Note 2>

The micro-Raman device according to Supplementary Note 1, in which an OD value of the second ND filter is different from an OD value of the first ND filter.

<Supplementary Note 3>

The micro-Raman device according to Supplementary Note 1 or 2, further including:

a third ND filter; and a fourth ND filter, in which a ninth through hole and a tenth through hole that penetrate through the first holder in the second direction are further formed in the first holder, when the first holder is rotated around the first rotation axis such that the ninth through hole overlaps with the first laser light, the tenth through hole overlaps with the second laser light, an eleventh through hole and a twelfth through hole that penetrate through the second holder in the second direction are further formed in the second holder, when the second holder is rotated around the second rotation axis such that the eleventh through hole overlaps with the first laser light, the twelfth through hole overlaps with the second laser light, the third ND filter is arranged on the first holder in a manner extending over the ninth through hole and the tenth through hole, and the fourth ND filter is arranged on the second holder in a manner extending over the eleventh through hole and the twelfth through hole.

<Supplementary Note 4>

The micro-Raman device according to Supplementary Note 3, in which an OD value of the third ND filter is different from the OD value of the first ND filter, and an OD value of the fourth ND filter is different from the OD value of the second ND filter and from the OD value of the third ND filter.

Although embodiments of the present invention have been described, the embodiments disclosed herein are considered in all respects as illustrative and not restrictive. The scope of the present invention is indicated by the appended claims, and all changes within the meaning and scope equivalent to the scope of the claims are intended to be included.

What is claimed is:

1. A micro-Raman device comprising;

a first laser light source;

a second laser light source;

a first holder;

a second holder;

a first ND filter; and a second ND filter, wherein the first laser light source and the second laser light source generate first laser light of a first wavelength and second laser light of a second wavelength, respectively, the second wavelength is different from the first wavelength, the first laser light and the second laser light proceed in a second direction orthogonal to a first direction while being separated from each other in the first direction, the first holder and the second holder are arranged overlapping each other in the second direction, the first holder is rotatable around a first rotation axis that is parallel to the second direction, the second holder is rotatable around a second rotation axis that is parallel to the second direction, a first through hole, a second through hole, a third through hole, and a fourth through hole that penetrate through the first holder in the second direction are formed in the first holder, when seen along the second direction, the first through hole and the second through hole are on an arc that has the first rotation axis at a center and that has a radius that is equal to a distance between the first rotation axis and the first laser light, when seen along the second direction, the third through hole and the fourth through hole are on an arc that has the first rotation axis at a center and that has a radius that is equal to a distance between the first rotation axis and the second laser light, a distance between the second through hole and the fourth through hole is smaller than a distance between the second through hole and the third through hole, when the first holder is rotated around the first rotation axis such that one of the first through hole and the second through hole overlaps with the first laser light, the third through hole and the fourth through hole are both shifted from the second laser light, when the first holder is rotated around the first rotation axis such that one of the third through hole and the fourth through hole overlaps with the second laser light, the first through hole and the second through hole are both shifted from the first laser light, a fifth through hole, a sixth through hole, a seventh through hole, and an eighth through hole that penetrate through the second holder in the second direction are formed in the second holder, when seen along the second direction, the fifth through hole and the sixth through hole are on an arc that has the second rotation axis at a center and that has a radius that is equal to a distance between the second rotation axis and the first laser light, when seen along the second direction, the seventh through hole and the eighth through hole are on an arc that has the second rotation axis at a center and that has a radius that is equal to a distance between the second rotation axis and the second laser light, a distance between the sixth through hole and the eighth through hole is smaller than a distance between the sixth through hole and the seventh through hole, when the second holder is rotated around the second rotation axis such that one of the fifth through hole and the sixth through hole overlaps with the first laser light, the seventh through hole and the eighth through hole are both shifted from the second laser light, when the second holder is rotated around the second rotation axis such that one of the seventh through hole and the eighth through hole overlaps with the second laser light, the fifth through hole and the sixth through hole are both shifted from the first laser light, the first ND filter is arranged on the first holder in a manner extending over the second through hole and the fourth through hole, and the second ND filter is arranged on the second holder in a manner extending over the sixth through hole and the eighth through hole.

2. The micro-Raman device according to claim 1, wherein an OD value of the second ND filter is different from an OD value of the first ND filter.

3. The micro-Raman device according to claim 1, further comprising:

a third ND filter; and a fourth ND filter, wherein a ninth through hole and a tenth through hole that penetrate through the first holder in the second direction are further formed in the first holder, when the first holder is rotated around the first rotation axis such that the ninth through hole overlaps with the first laser light, the tenth through hole overlaps with the second laser light, an eleventh through hole and a twelfth through hole that penetrate through the second holder in the second direction are further formed in the second holder, when the second holder is rotated around the second rotation axis such that the eleventh through hole overlaps with the first laser light, the twelfth through hole overlaps with the second laser light, the third ND filter is arranged on the first holder in a manner extending over the ninth through hole and the tenth through hole, and the fourth ND filter is arranged on the second holder in a manner extending over the eleventh through hole and the twelfth through hole.

4. The micro-Raman device according to claim 3, wherein an OD value of the third ND filter is different from the OD value of the first ND filter, and an OD value of the fourth ND filter is different from the OD value of the second ND filter and from the OD value of the third ND filter.

* * * * *